United States Patent

Grunert et al.

[11] Patent Number: 5,855,355
[45] Date of Patent: Jan. 5, 1999

[54] QUIET AND CONSTANT FLOW CONTROL VALVE

[75] Inventors: Jordan Bryce Grunert, Beaver; James R. Shannon, Pittsburgh, both of Pa.

[73] Assignee: The Horton Company, Pittsburgh, Pa.

[21] Appl. No.: 814,784

[22] Filed: Mar. 10, 1997

[51] Int. Cl.⁶ .................................................... F16K 47/00
[52] U.S. Cl. .......................... 251/120; 251/118; 138/45; 138/46
[58] Field of Search ..................... 251/120, 118, 251/127; 138/40, 44, 45, 46, 43

[56] References Cited

U.S. PATENT DOCUMENTS

| | | |
|---|---|---|
| 1,953,110 | 4/1934 | Holtane . |
| 2,454,929 | 11/1948 | Kempton .................................. 138/45 |
| 2,790,463 | 4/1957 | Delano et al. . |
| 2,816,572 | 12/1957 | Pratt . |
| 2,899,979 | 8/1959 | Dahl et al. ................................. 138/45 |
| 2,936,788 | 5/1960 | Dahl et al. ................................. 138/45 |
| 3,444,897 | 5/1969 | Erickson .................................... 138/45 |
| 3,545,492 | 12/1970 | Scheid . |
| 3,566,923 | 3/1971 | Avery ........................................ 138/43 |
| 3,671,009 | 6/1972 | Stampfli ............................. 251/129.07 |
| 3,724,502 | 4/1973 | Hayner et al. . |
| 4,266,576 | 5/1981 | Bradford ................................... 138/45 |
| 4,457,343 | 7/1984 | Zukausky . |
| 4,492,339 | 1/1985 | Kreitzberg ................................ 138/45 |
| 4,609,014 | 9/1986 | Jurjevic et al. . |
| 4,657,185 | 4/1987 | Rundzaitis . |
| 4,708,166 | 11/1987 | Kobold . |
| 4,815,497 | 3/1989 | Pick .......................................... 251/120 |
| 5,025,835 | 6/1991 | Mon . |
| 5,082,240 | 1/1992 | Richmond ............................... 251/120 |
| 5,154,394 | 10/1992 | DuHack .................................... 138/45 |
| 5,226,446 | 7/1993 | Cooper . |
| 5,487,528 | 1/1996 | Richmond ................................ 138/45 |
| 5,495,872 | 3/1996 | Gallagher et al. . |

*Primary Examiner*—Denise L. Ferensic
*Assistant Examiner*—John Ball
*Attorney, Agent, or Firm*—Sixbey, Friedman, Leedom & Ferguson; Donald R. Studebaker

[57] ABSTRACT

A fluid flow control device for maintaining a substantially constant predetermined rate of flow through a control valve including a fluid flow passage for directing fluid flow through the valve, a resilient fluid flow rate control washer positioned in the fluid flow passage for maintaining a substantially constant predetermined rate of flow through an outlet of the fluid flow passage irrespective of a pressure of the fluid in the passage and fluid flow conditioning washers for conditioning the flow of fluid through the flow rate control washer with the fluid flow conditioning washers being movable with respect to the flow rate control washer for aiding in the conformability of the flow rate control washer. Preferably, at least two fluid flow conditioning washers are positioned upstream of the flow rate control washer and at least one fluid flow conditioning washer is positioned downstream of the flow rate control washer.

20 Claims, 3 Drawing Sheets

FIG.5
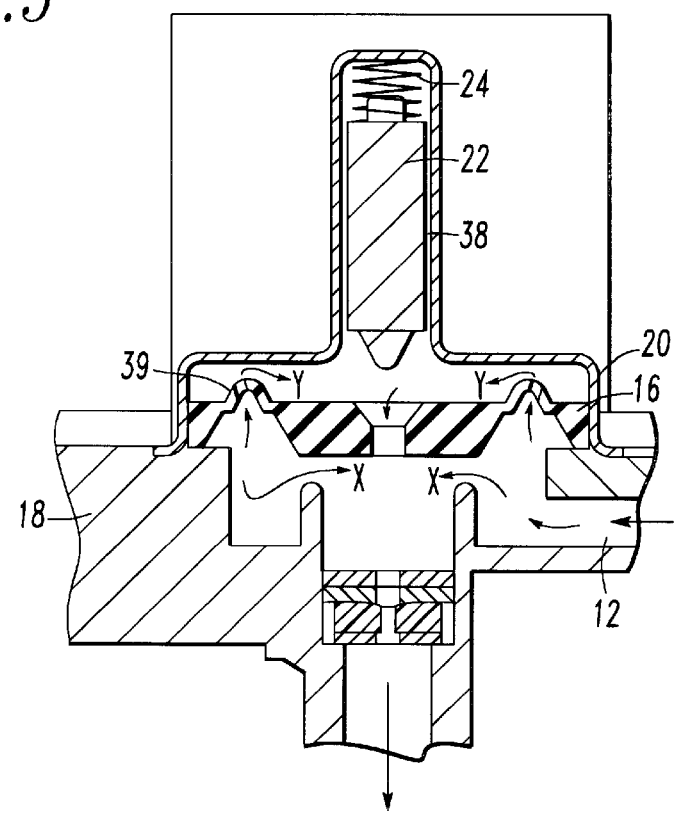
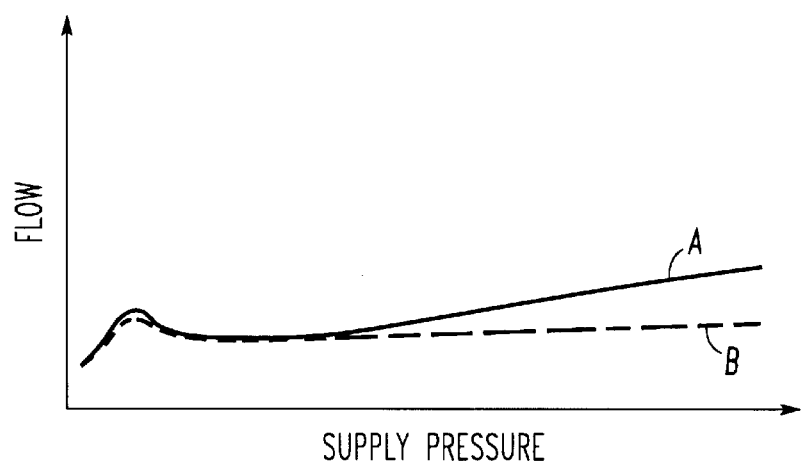
FIG.6

QUIET AND CONSTANT FLOW CONTROL VALVE

TECHNICAL FIELD

The present invention relates to the control of fluid flow in fluid dispensers or domestic appliances and more particularly to a valve and flow control device which provides sufficient laminar flow so as to permit a flow control washer to maintain its geometry and enhance its capability to maintain an even fluid flow rate.

BACKGROUND OF THE INVENTION

In providing flow rate control to various types of dispensing systems, which are connected to either domestic or international water supplies, it is desired to provide a generally constant flow rate to the dispenser inlet despite being provided with wide variations in the water supply pressure. Various types of flow control devices have been employed for this purpose and a particular well-known device is a elastomeric flow washer which deforms resiliently under increasing supply pressure to restrict the flow orifice size thereby maintaining a constant flow rate. Such a device is illustrated in U.S. Pat. No. 2,816,572 issued to Pratt.

However, in providing flow control to the water inlet of the dispensing device, problems have been experienced in excessive noise where the restriction of the flow control device have produced cavitation. In cases where the flow control is applied at the inlet of an electrically operated water inlet valve, the noise problem has been particularly exacerbated by the flow cavitation causing resonant vibration of the surrounding valve body structure. This problem has been particularly troublesome in appliance water inlet valves having a body structure rigidly secured to a surrounding metal frame or cabinet of the dispenser.

Where the dispenser water inlet flow control device is required to control substantial restriction to accommodate relatively high water supply pressure for maintaining a constant flow rate to the device, severe high frequency vibration has been encountered as cavitation occurs at the flow control device and the resulting noise is perceived to be quite objectionable to the user. In this regard, efforts have been undertaken to inexpensively control the noise associated with the flow control devices employed for controlling the flow rate through such devices.

As is illustrated in U.S. Pat. No. 5,226,446 issued to Cooper, a flow noise reduction assembly is set forth having flow limiting orifice, that being an inlet pressure responsive flow control washer having flow limiting capabilities. Additionally, a conically faced diverter is disposed closely adjacent the down stream face of the orifice and an expansion chamber is disposed down stream of the flow diverter for noise attenuation. However, by providing the diverter down stream of the flow control washer, variations in fluid flow due to the diverter may continue to occur. Moreover, it is imperative that the diverter be sized in a manner which provides appropriate dispersion of the fluid flow without creating unnecessary turbulence in the flow of fluid through the system. In addition to the foregoing, the conically faced diverter disposed closely adjacent to down stream face of the orifice includes thin radial spokes which extend between the diverter and an outer rim thereof. Over time, these radial spokes may wear, thus requiring the assembly to be inspected and serviced on a regular basis.

As noted hereinabove, a typical water control valve is normally comprised of inlet and outlet orifices, diagrams for causing the opening and closing of the water flow path, an armature which drives a by-directional diaphragm and a coil structure which energizes and de-energizes the armature, thus resulting in the opening and closing of the water flow path. Other than the power consumption and physical space requirements of the valve, important requirements of the consumer were related to the consistency of the water flow, the noise level of the valve during its operating cycle and costs associated with maintaining the proper operation of the valve.

A valve of this type has a variety of uses. The most typical use of the types of valves set forth herein is to, upon command, initiate and maintain a water flow to fill a container to a predetermined quantity, after which the flow is stopped. Of utmost importance to the consumer is that the quantity of water supplied is at a particular rate and dispensed by a particular control scheme such that the total quantity of fluid dispensed would be within a desired tolerance. As noted hereinabove, due to the variability of the supply pressure, the flow rate of typical valves is not consistent over a range of for example 20 to 120 psig supply pressures. Accordingly, in that the customer is expecting a particular quantity or flow rate, a variation in the flow rate may ensue due to the inability of the valve to discern the supply pressure variation. In some instances, adjustment of the flow rate may be carried out manually, however, for most uses, automatic control is not only desirable, but required. One component of an automatic flow control device is a simple timer which is an inexpensive, accurate and even programmable method to obtain a desired result. Timers are generally accurate and repeatable over a long period of time, however, controlling the actual flow rate through the valve lends itself to unique dramatic considerations. Variations in basic pressure as well as time variable pressure must be handled in a manner which produces uniform flow rates over the life of the control valve.

Clearly, there is a need for a flow control valve which provides steady and constant fluid flow throughout a range of supply pressures as is often found in domestic and international water systems. Moreover, there is a need for a control valve which supplies substantially steady and constant flow through the valve while minimizing sound attenuation associated with prior art valves.

SUMMARY OF THE INVENTION

A primary object of the present invention is to overcome the aforementioned shortcomings associated with prior art flow control valves.

A further object of the present invention is to provide a control valve which exhibits steady and constant flow rates throughout a wide range of supply pressures.

A still further object of the present invention is to provide a control valve which not only exhibits steady and constant flow rates through a wide range of supply pressures but does so in a quiet and controlled manner.

A further object of the present invention is to provide a flow control washer which varies its geometry in response to the supply pressure passing through the control valve.

A still further object of the present invention is to provide flow conditioning washers within the cavity of the flow control valve for reducing the turbulent flow of fluid through the valve and inducing a laminar flow through the flow control washer.

A more important object of the present invention is to produce a variance flow which will allow for steady flow control washer function and thus a steady flow rate of fluid through the flow control valve.

A still further object of the present invention is to provide a flow control valve wherein the extraneous noise produced by the actuating coil driving the armature is reduced. More particularly, by producing internal laminar flow within the control valve, a dampening affect on the armature is realized.

These as well as additional objects of the present invention are achieved by providing a fluid flow control device for maintaining a substantially constant predetermined rate of flow through a control valve including a fluid flow passage for directing fluid flow through the valve, a resilient fluid flow rate control washer positioned in the fluid flow passage for maintaining a substantially constant predetermined rate of flow through an outlet of the fluid flow passage irrespective of a pressure of the fluid in the passage and fluid flow conditioning washers for conditioning the flow of fluid through the flow rate control washer with the fluid flow conditioning washers being movable with respect to the flow rate control washer for aiding in the conformability of the flow rate control washer. Preferably, at least two fluid flow conditioning washers are positioned upstream of the flow rate control washer and at least one fluid flow conditioning washer is positioned downstream of the flow rate control washer.

These, as well as additional objects and advantages of the present invention will become apparent from the following detailed description of the invention when read in light of the several figures.

BRIEF DESCRIPTION OF THE DRAWINGS

FIG. 5 is a cross-sectional view of an alternative embodiment of the present invention including pressure equalization.

FIG. 6 is a graphic illustration of the operation of a flow control valve incorporating the flow control system in accordance with the present invention as compared to that of prior art flow control devices.

DETAILED DESCRIPTION OF THE PRESENT INVENTION

Referring now to the several figures, the present invention will now be described in greater detail hereinbelow.

Figure 1:
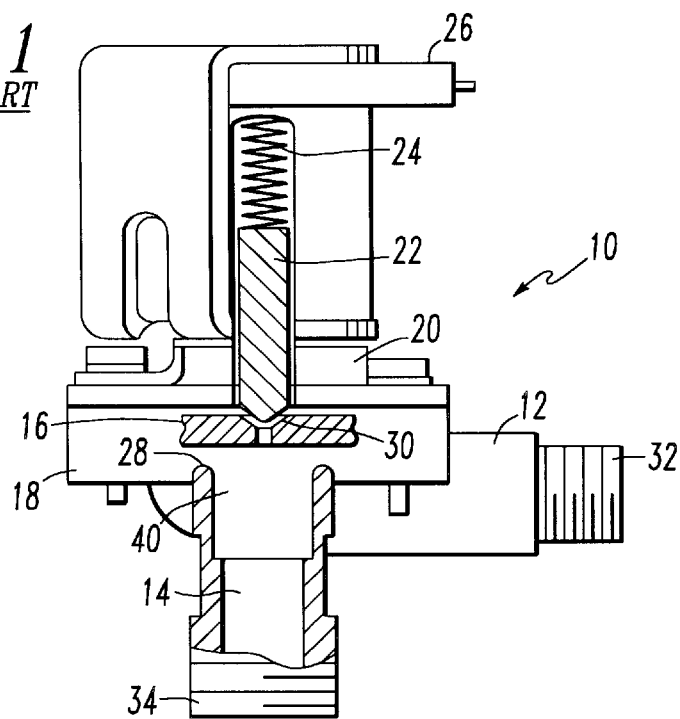
FIG. 1 is a cross-sectional view of a typical valve construction.

Initially, references made to FIG. 1 wherein like reference numerals will be used to designate like elements throughout the several figures. FIG. 1 illustrates a conventional control valve for controlling fluid flow in fluid dispensers or domestic appliances requiring the interruption of what would otherwise be a substantially continuous flow of fluid therethrough. The control valve 10 includes a fluid inlet 12 and an outlet 14 which are fluidly isolated from one another by a displaceable diaphragm 16. Also positioned within the valve housing 18 is a sealing guide 20 which reciprocally receives an armature 22 which is biased in a closed position by way of a spring 24. Movement of the armature 22 within the housing 18 is controlled by way of electric pulses supplied to a coil 26. Generally in the rest position, the diaphragm 16 sealingly engages the uppermost ends 28 of the outlet 14 and the armature 22 sealingly engages the valve 30 formed in the diaphragm 16, with the armature 22 being biased in the closed position by way of spring 24. When an electric pulse is sent to the coil 26, the armature 22 is displaced in an upward direction against the force of spring 24 in order to permit fluid pressure from the inlet 12 to displace the diaphragm 16 thus commencing fluid flow from the inlet 12 to the outlet 14 in a known manner. It is also noted that the valve 10 may be readily positioned within new or existing fluid flow systems by way of the threaded regions 32 and 34 on both the inlet 12 and outlet 14, respectively. As discussed hereinabove, there are various uses for the type of valve illustrated in FIG. 1. The most typical is that of a water valve which upon command initiates and maintains water flow to fill a container to a predetermined quantity after which the flow through the control valve is stopped. It should be noted that due to variations in supply pressures, the flow rate through the valve illustrated in FIG. 1 is not consistent over the full range of supply pressures. Hence, when a consumer is expecting a particular quantity or flow rate through the valve, a very different flow rate may ensue due to the inability of the valve to discern the particular supply pressure variation. In this regard, variations in the time in which the valve remains open may be manually or automatically adjusted. However, such adjustment is cumbersome.

Figure 2:
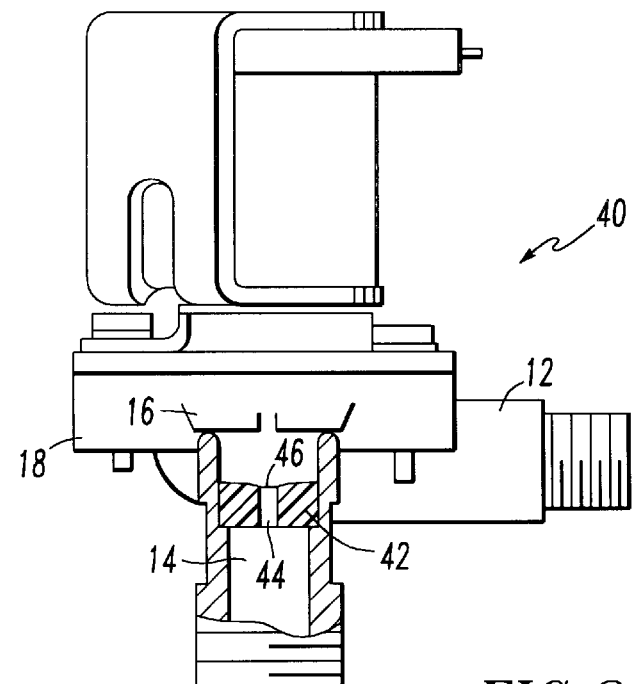
FIG. 2 is a cross-sectional view of a typical valve construction incorporating a flow control washer therein.

One attempt to maintain a substantially constant flow rate through the valve illustrated in FIG. 1 is set forth in FIG. 2. Like the valve 10 of FIG. 1, valve 40 includes an inlet 12, outlet 14 as well as sealing diaphragm 16. While not illustrated in detail, the valve also includes a sealing guide, armature and biasing means similar to that illustrated in FIG. 1, all within the housing 18. With the valve illustrated in FIG. 2, a resilient flow rate control washer 42 is provided which can, to a degree geometrically reconform itself as the applied fluid pressure changes, much like the control device illustrated in U.S. Pat. No. 5,226,446. The resilient flow control washer 42 includes a flow control orifice 44 formed centrally therein and a flared mouth portion 46 merging from the orifice 44 on one face of the washer 42. During the flow of fluid through the control valve, the flow washer 42 is deformed as a result of fluid pressure being applied to the end face of the washer 42. As increasingly higher pressures deform the flow washer, the flow control washer 42 will control the flow of fluid through the washer so as to attempt to pass a substantially constant flow of fluid through the outlet 14. The hardness of the flow washer 42 is chosen in a manner to provide the utmost control over the flow of fluid therethrough. However, with reference to FIG. 6, the flow of fluid through the control valve illustrated in FIG. 2 follows the curve A illustrated therein. As can be seen from this graph, the flow, while initially constant continues to increase over increases in the supply pressure. Accordingly, it has been determined that the flow control washer in and of itself while maintaining a flow closer to a constant flow than that valve illustrated in FIG. 1 still results in a valve which exhibits undesirable variations in the quantity of fluid flowing through the valve with a variation in the supply pressure.

Figure 3:
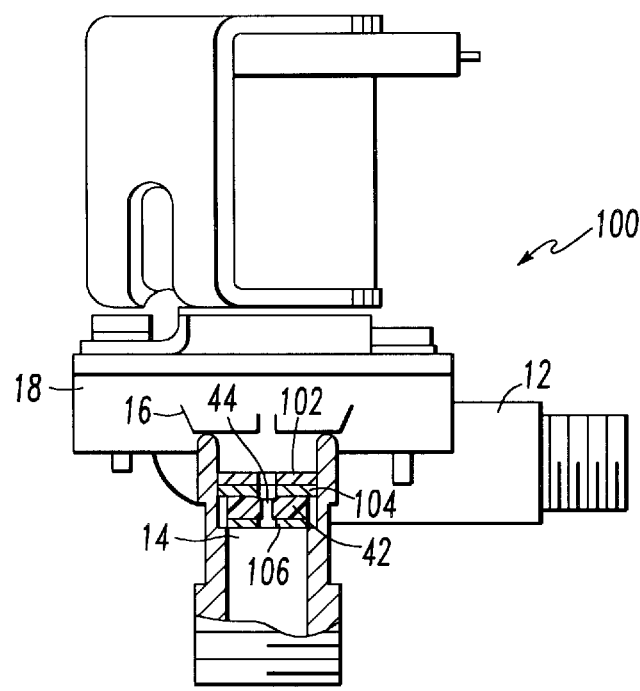
FIG. 3 is a cross-sectional view of a valve construction incorporating the flow control system in accordance with the present invention.
Figure 4:
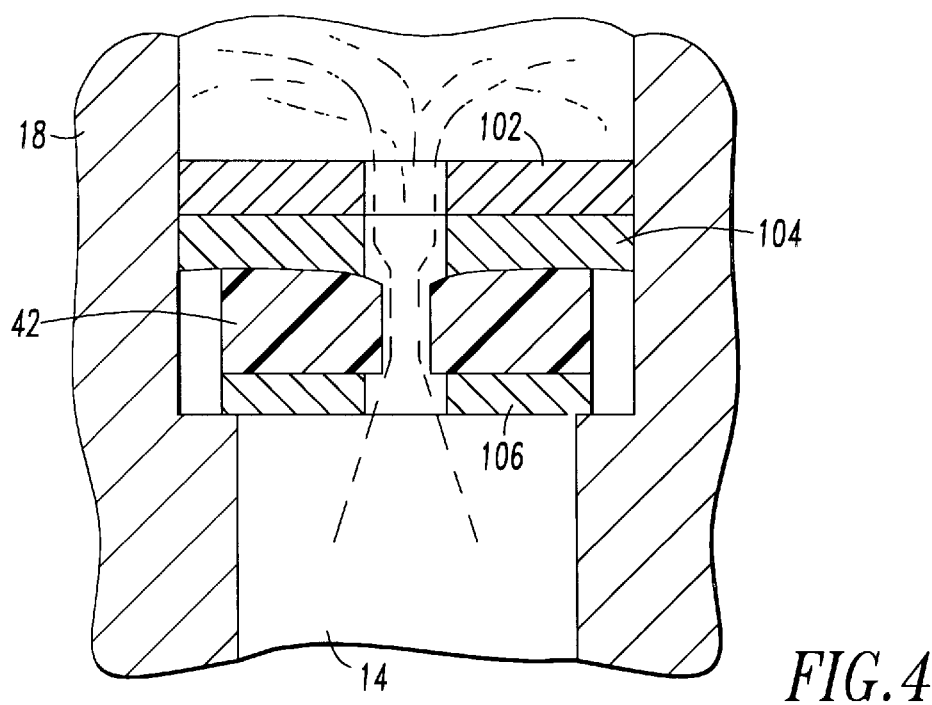
FIG. 4 is an enlarged view of the flow control system in accordance with the present invention.

With reference now being made to FIGS. 3 and 4, the essence of the present invention will now be described in detail. As with valves 10 and 40 illustrated in FIGS. 1 and 2, respectively, the control valve 100 includes an inlet 12 and an outlet 14 formed within the housing 18. Also positioned within the housing 18 is a diaphragm 16, sealing guide, armature and biasing spring as best illustrated in FIG. 1.

As with the control valve illustrated in FIG. 2, the valve 100 includes a flow rate control washer 42 having a flow orifice 44 formed therein. This washer 42 being formed of resilient material such that the washer may deform in response to pressure changes within the control valve 100. In addition to the flow rate control washer 42, the control valve of FIG. 3 includes flow conditioning washers 102, 104 and 106. This washer configuration being best illustrated in FIG. 4.

With reference now to FIG. 4, positioned within the fluid outlet 14 which is formed within the valve housing 18, are the flow rate control washer 42 and flow conditioning washers 102, 104 and 106. In particular, the flow conditioning washers 102 and 104 may be considered inlet conditioning washers while flow conditioning washer 106 may be considered an outlet conditioning washer. The washers are formed of a material having a hardness greater than that of the flow control washer 42. Particularly, the flow conditioning washers 102, 104 and 106 may be formed of a metallic material, plastic or other suitably rigid material which permits the flow control washer 42 to be deformed due to fluid pressure applied to the flow conditioning washers 102 and 104 as well as the flow control washer 42.

It should be noted that the flow control washer 42 and flow conditioning washers 102, 104 and 106 while illustrated as being positioned within the outlet 14, such a configuration may also be positioned elsewhere in the flow conduit, however, better success is achieved in the manner illustrated in FIGS. 3–5.

As can be seen from these figures, the flow conditioning washers 102 and 104 are positioned adjacent the flow control washer 42 on the upstream side thereof while the flow conditioning washer 106 is positioned on the downstream side of the flow control washer 42. The dynamics of the water entering the flow washer are such which in the valve illustrated in FIG. 2 inherently induces a turbulence. This turbulent flow makes it difficult for the flow control washer 42 to configure itself in the proper manner so as to provide a constant flow rate. As noted hereinabove, variation in the geometry of the flow control washer 42 produces a variation in the flow rate through such washer. Accordingly, as can be seen from FIGS. 3–5, by positioning the flow conditioning washers 102, 104 and 106 in the manner illustrated therein, the flow control washer 42 may properly adjust its geometry so as to produce a substantially constant and steady flow rate through the outlet 14. This is particularly achieved by a slight agitation of the flow control washer 42 which is imparted to the flow control washer 42 by the flow conditioning washers 102 and 104. This agitation is further enhanced by the use of at least two flow conditioning washers on the upstream side of the control washer 42. This agitation aids in the ability of the flow control washer 42 to assume the requisite geometry in response to the supply pressure.

The particular number of flow conditioning washers utilized may be adjusted depending upon the particular flow characteristics of the control valve. In the illustrated embodiments, two flow conditioning washers 102 and 104 are positioned on the upstream side of the flow control washer 42 while only a single flow conditioning washer 106 is positioned on the downstream side of the washer. Again, any number of flow conditioning washers may be utilized so long as sufficient laminar water flow is presented to the flow control washer 42 to permit the flow control washer to maintain its geometry and enhance its capability to maintain an even water flow rate. In addition to providing sufficient laminar water flow through the flow control washer 42, the segmented washer construction further acts to agitate the flow control washer 42 to aid in changing the geometry of the flow control washer 42 as the supply pressure changes.

It is further noted that relationship between the inside diameter of the flow conditioning washers 102, 104 and 106 with respect to the inside diameter of the flow control washer 42 will vary depending upon the particular use of the flow control valve. It has been determined that a ratio between the flow conditioning washer inside diameter and the flow control washer inside diameter may be in the range of 2 to 1 to 10 to 1, however, a ratio of approximately 5 to 1 is preferred for most applications. Clearly, the actual ratio of the inside diameter of the flow conditioning washers to the inside diameter of the flow control washer will be dependent upon the accuracy expected from the control valve. In the case of the control valve 100, the more conditioned the flow of fluid through the flow conditioning washers 102 and 104, the more accurate the flow through the flow control valve 42 will be.

With reference particularly to FIG. 5, with electronically operated control valves of the type disclosed herein, often times noise related to the energization of the coil and movement of the armature as well as maintenance of the armature in the opened condition creates a vibrating noise which can be an annoyance to the consumer. When energized, in a known manner, the armature 22 is retracted against the force of the biasing spring 24 and often times vibrates within the chamber 38. With the valve illustrated in FIG. 5, when the armature 22 is displaced, fluid pressure from the fluid passing through the inlet 12 displaces the diaphragm 16 and permits fluid flow in the direction of arrows X. Additionally, such that movement of the diaphragm 16 is not carried out against fluid pressure, fluid also passes through openings in the flex region 39 of the diaphragm as illustrated by arrows Y. In this regard, fluid pressure fills the cavity 38 formed by the sealing guide 20 and fills the space about the armature 22. By providing laminar flow within the interior of the control valve, a dampening effect about the armature is realized. With the pressure equalization being maintained about the diaphragm 16, the armature tends to float in a quiet region so as to dampened the vibration of the armature. In doing so, the audible hum experienced with many valves of this type is minimized. Additionally, the control valve set forth in accordance with the present invention produces a flow of fluid therethrough which achieves the flow characteristics illustrated by curve B is FIG. 6. That is, the flow through the flow control washer 42 remains constant over the wide range of supply pressures.

Accordingly, as can be seen from the foregoing discussions, the present invention provides for a flow control washer and flow conditioning washers positioned in a manner so as to provide a substantially constant flow rate from the control valve while reducing the armature vibration within the actuation mechanism itself. Accordingly, by selecting the most optimum thickness and inside diameter for the flow conditioning washers, a control valve, a flow control valve exhibiting the foregoing characteristics can be achieved.

While the present invention has been described with reference to a preferred embodiment, it will be appreciated by those skilled in the art that the invention may be practiced otherwise than as specifically described herein without departing from the spirit and scope of the invention. It is, therefore, to be understood that the spirit and scope be limited only by the appended claims.

We claim:

1. In a fluid flow control valve, a fluid flow control device for maintaining a substantially constant predetermined rate of flow through the valve, comprising:

a fluid flow directing means for directing fluid flow through the valve;

a resilient fluid flow rate control means positioned in said fluid flow directing means for maintaining the substantially constant predetermined rate of flow through an outlet of said fluid flow directing means irrespective of a pressure of the fluid; and a displaceable fluid flow conditioning means for conditioning the flow of fluid through said flow rate control means; said displaceable fluid flow conditioning means being movable with respect to said flow rate control means as fluid flows through said fluid flow directing means for aiding in the conformability of said flow rate control means.

2. The control device as defined in claim 1, wherein said fluid flow conditioning means includes a plurality of fluid flow conditioning washers.

3. The control device as defined in claim 2, wherein at least two fluid flow conditioning washers are positioned upstream of said flow rate control means.

4. The control device as defined in claim 3, wherein at least one fluid flow conditioning washer is positioned down stream of said flow rate control means.

5. The control device as defined in claim 4, wherein said resilient fluid flow control means is an elastomeric washer having a central orifice which varies in diameter dependent upon the pressure of the fluid directed to said fluid flow control means.

6. The control device as defined in claim 5, wherein each of said flow conditioning washers include a central orifice of a predetermined inside diameter.

7. The control device as defined in claim 6, wherein said inside diameter of said flow conditioning washers is greater than an inside diameter of said elastomeric washer in a rest position.

8. The control device as defined in claim 7, wherein said inside diameter of said flow conditioning washers is in a range of two to ten times the inside diameter of said elastomeric washer in the rest position.

9. The control device as defined in claim 8, wherein said inside diameter of said flow conditioning washers is approximately five times the inside diameter of said elastomeric washer in the rest position.

10. A flow control valve comprising:

a housing including an inlet passage, an outlet passage and a sealing means for selectively fluidically communicating said inlet passage and said outlet passage;

a fluid flow rate control means positioned in said outlet passage;

a displaceable stabilizing means for stabilizing said fluid flow rate control means, said stabilizing means including a plurality of flow conditioning washers;

wherein said flow rate control means provides a substantially constant flow rate through said outlet passage irrespective of a fluid supply pressure in said inlet passage; and wherein said fluid flow rate control means is an elastomeric washer having a central orifice which varies in diameter dependent upon the pressure of the fluid directed to said fluid flow control means.

11. The control valve as defined in claim 10, wherein said flow conditioning washers are positioned adjacent said elastomeric washer.

12. The control valve as defined in claim 11, wherein said flow conditioning washers are movable with respect to said elastomeric washer.

13. The control valve as defined in claim 10, wherein at least two fluid flow conditioning washers are positioned upstream of said flow rate control means.

14. The control device as defined in claim 13, wherein at least one fluid flow conditioning washer is positioned down stream of said flow rate control means.

15. The control device as defined in claim 14, wherein each of said flow conditioning washers include a central orifice of a predetermined inside diameter.

16. The control device as defined in claim 15, wherein said inside diameter of said flow conditioning washers is greater than an inside diameter of said elastomeric washer in a rest position.

17. The control device as defined in claim 16, wherein said inside diameter of said flow conditioning washers is in a range of two to ten times the inside diameter of said elastomeric washer in the rest position.

18. The control device as defined in claim 17, wherein said inside diameter of said flow conditioning washers is approximately five times the inside diameter of said elastomeric washer in the rest position.

19. The control device as defined in claim 10, wherein the flow control valve is an electronically actuated control valve including an armature reciprocally received within an armature chamber in said housing.

20. The control device as defined in claim 19, wherein said armature chamber receives fluid pressure equal to the fluid pressure bypassing said sealing means when the valve is in an open position.

* * * * *